United States Patent
Bhawalkar et al.

(10) Patent No.: US 9,496,678 B2
(45) Date of Patent: Nov. 15, 2016

(54) DEVICE FOR REDUCING OPTICAL FEEDBACK INTO LASER AMPLIFIER

(71) Applicant: Candela Corporation, Wayland, MA (US)

(72) Inventors: Jayant D. Bhawalkar, Auburndale, MA (US); Xiaoming Shang, Lexington, MA (US); Jinze Qiu, Natick, MA (US); Michael Clancy, Westford, MA (US)

(73) Assignee: Candela Corporation, Wayland, MA (US)

( * ) Notice: Subject to any disclaimer, the term of this patent is extended or adjusted under 35 U.S.C. 154(b) by 0 days.

(21) Appl. No.: 14/838,398

(22) Filed: Aug. 28, 2015

(65) Prior Publication Data

US 2016/0064893 A1    Mar. 3, 2016

Related U.S. Application Data

(60) Provisional application No. 62/043,574, filed on Aug. 29, 2014.

(51) Int. Cl.
| | | |
|---|---|---|
| *H01S 3/00* | (2006.01) | |
| *H01S 3/13* | (2006.01) | |
| *H01S 3/23* | (2006.01) | |
| *H01S 3/16* | (2006.01) | |

(52) U.S. Cl.
CPC ........... *H01S 3/1305* (2013.01); *H01S 3/0064* (2013.01); *H01S 3/1301* (2013.01); *H01S 3/1643* (2013.01); *H01S 3/2308* (2013.01); *H01S 3/1611* (2013.01); *H01S 3/2316* (2013.01); *H01S 2301/02* (2013.01)

(58) Field of Classification Search
CPC ... H01S 3/1305; H01S 3/1301; H01S 3/0064
USPC ........................................................ 359/337
See application file for complete search history.

(56) References Cited

U.S. PATENT DOCUMENTS

| | | | |
|---|---|---|---|
| 5,568,496 A | 10/1996 | Justus et al. | |
| 2004/0202220 A1 | 10/2004 | Hua et al. | |
| 2010/0309945 A1* | 12/2010 | Govorkov | H01S 3/10092 372/57 |
| 2015/0188277 A1* | 7/2015 | Nowak | H01S 3/076 359/342 |

FOREIGN PATENT DOCUMENTS

WO    2014045889 A1    3/2014

OTHER PUBLICATIONS

International Search Report and Written Opinion in PCT/US2015/047311 dated Dec. 1, 2015.

* cited by examiner

*Primary Examiner* — Mark Hellner
(74) *Attorney, Agent, or Firm* — Manelli Selter PLLC; Edward J. Stemberger

(57) ABSTRACT

A device for reducing spontaneous emission in laser oscillator laser amplifier laser system.

20 Claims, 4 Drawing Sheets

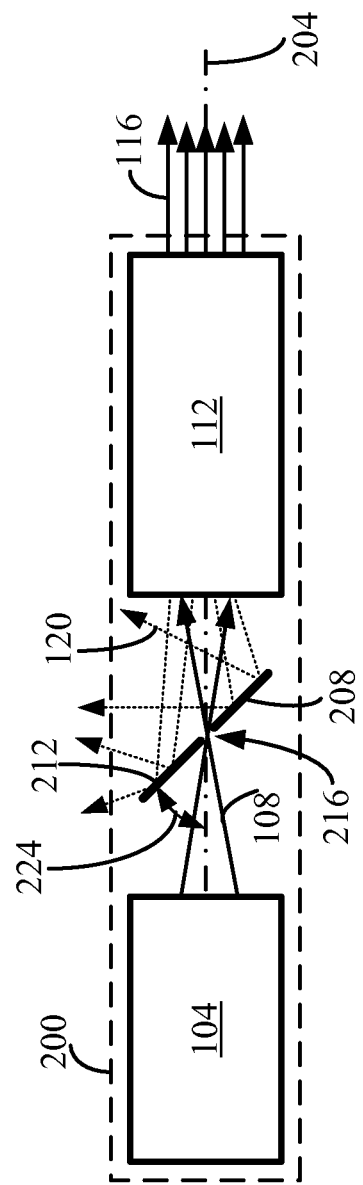
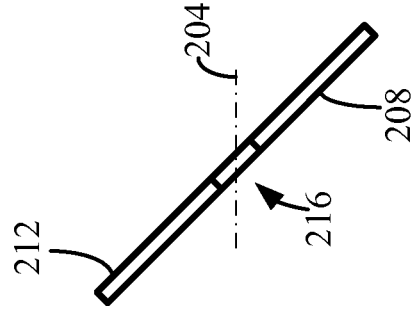
FIG. 3
FIG. 4

DEVICE FOR REDUCING OPTICAL FEEDBACK INTO LASER AMPLIFIER

The present device relates to laser amplifiers and in particular to devices for reducing optical feedback in laser amplifiers.

BACKGROUND

High pulse energy laser systems are generally built around laser oscillator-laser amplifier configurations. Typically, such laser systems include a low-power laser oscillator followed by a laser amplifier that increases the pulse energy to the desired energy level. Frequently used high-gain laser amplifier media is for example Nd:YAG media. The Nd:YAG media and other similar medias have a tendency for Amplified Spontaneous Emission (ASE). ASE is produced when a laser amplifier medium is pumped to produce a population inversion. Feedback of the ASE into the laser's optical cavity may produce unintended laser operation if the lasing threshold is reached. Excess ASE and spurious lasing is an unwanted effect in lasers, since it limits the maximum gain that can be achieved in the gain medium. ASE also depletes the stored energy in the medium and therefore reduces the potential amplification factor.

There are a number of methods and devices employed to reduce the stray photons from entering the amplifier medium and depleting the gain.

The most common reason for the photons emitted as fluorescence to re-enter the laser amplifier medium is due to unintended reflections from surfaces of the optical elements in the laser beam path and even from the surfaces of optical mounts. One of the commonly used techniques for prevention of reflections is to tilt the optics at small angles, for example 0.7 or 0.8 degrees so as to deflect the reflections out of the path of the laser beam. Although widely used, this technique places the optical elements in an off-axis arrangement and adversely affects the quality of the laser beam.

Another technique to reduce the stray photons to re-enter the amplifier medium involves use of Faraday isolators. Faraday isolators are employed to selectively block reflected light, although the isolators maintain a common optical axis with the rest of the optical system. However, Faraday isolators are only applicable to polarized laser light. The polarization properties of the reflected light could be different from that of the incident light. The effectiveness of employing Faraday isolators to attenuate laser light reflected from surface of optical elements is limited.

Faraday isolators have relatively low transmission and their use in high power lasers system reduces energy efficiency and could even result in the isolator damage by the absorbed energy.

Both industry and science are in need of high power, pulsed laser systems and the parasitic optical feedback could be a limiting factor in system operation. Thus, improved methods and systems for reducing stray light reflected from different surfaces in the laser beam path are desired.

GLOSSARY

A laser amplifier is a device which receives a certain input laser beam and generates an output laser beam with higher laser power. Typically, the input and output laser beams propagate in free space.

Amplified spontaneous emission (ASE) is light, produced by spontaneous emission that has been optically amplified by the process of stimulated emission in a gain medium.

As used in the current disclosure the term aperture means an area of a reflective plate or radiation absorbing plate that possesses different optical characteristics than the rest of the plate surface. The aperture could be a segment of the plate with a coating possessing properties different from the rest of the plate, a hole in the plate configured to transmit a desired laser beam, a segment of uncoated transparent medium or anti-reflection coated medium or a medium oriented at Brewster's angle

SUMMARY

Disclosed is a device that can be used to reduce the spontaneous fluorescence photons from re-entering the laser amplifier medium (optical feedback) due to stray reflection and scattering, thereby reducing parasitic lasing and increasing the energy storage, gain and energy extraction from the laser amplifier by the input oscillator beam. The device could also serve the purpose of optically isolating a laser oscillator from a laser amplifier by allowing the desired laser beam from the laser oscillator to pass through to the laser amplifier, but preventing any optical noise (spontaneous emission) from getting back to the laser oscillator and/or amplifier and disrupting its operation. The device could also serve the purpose of isolating two amplifier stages in a multi-stage laser amplifier.

The device described here consists of a flat plate placed between the oscillator and the amplifier, or between multiple amplifier stages, oriented at an angle with respect to the laser beam path and having a reflecting or absorbing surface at an angle with respect to the laser beam path or common optical axis of the laser oscillator and laser amplifier chain. The surface of the plate could be advantageously configured to be highly polished and free of surface contamination to minimize light scattering. The device also has an aperture transparent to the incident light, which could be the light emitted by the laser oscillator. In one example, the device could be a metal plate with an aperture or hole configured to allow the desired laser oscillator beam to pass through.

In another example, the device could be a glass plate coated by a proper reflective coating with an aperture configured to allow the desired laser oscillator beam to pass through. The aperture could be a free of coating part of the glass plate. The aperture could be coated by an antireflection coating to reduce loss of energy of the transmitted laser oscillator beam. If the oscillator beam is linearly polarized, the glass plate could be oriented at the Brewster's angle relative to the oscillator output beam and the aperture could be uncoated.

DESCRIPTION OF THE DRAWINGS

FIG. 3 is an example of a laser oscillator-laser amplifier configuration including a device for spontaneous emission feedback and spurious lasing reduction;

FIG. 4 is a schematic illustration of the device for spontaneous emission feedback and spurious lasing reduction operation according to an example;

DETAILED DESCRIPTION OF AN EXAMPLE EMBODIMENT

Figure 1:
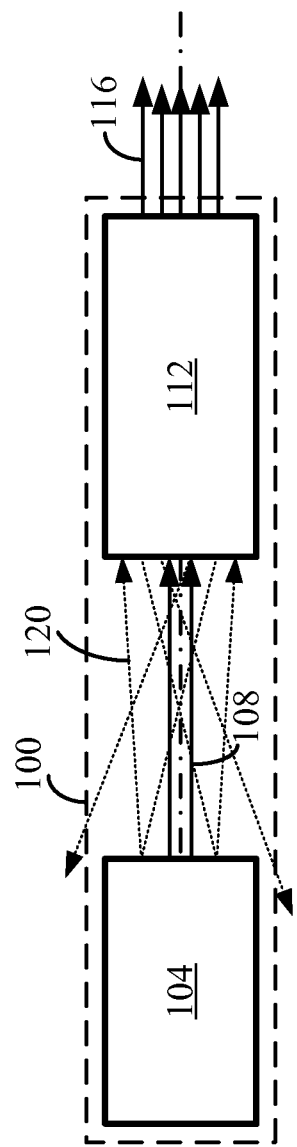
FIG. 1 is an example of existing laser oscillator-laser amplifier configuration.

Reference is made to FIG. 1 which is an example of existing laser oscillator-laser amplifier configuration. Typically, such laser oscillator-laser amplifier configuration 100 includes a laser oscillator 104 configured to generated a laser beam 108 and laser amplifier 112 configured to receive laser oscillator generated laser beam 108, amplify it and emit a higher power laser beam 116. Laser oscillator 104 could be for example, a Nd:YAG laser and laser amplifier 112 could be for example, such as frequently used high-gain amplifier media Nd:YAG. The Nd:YAG media and other similar medias have a tendency for amplified spontaneous emission and spurious lasing shown as rays 120, which depletes the stored energy in the amplifier medium and reduces the potential amplification factor. Therefore there is a desire to reduce the amount of stray spontaneous emission photons from entering the laser amplifier 112 medium and depleting the gain.

Figure 2:
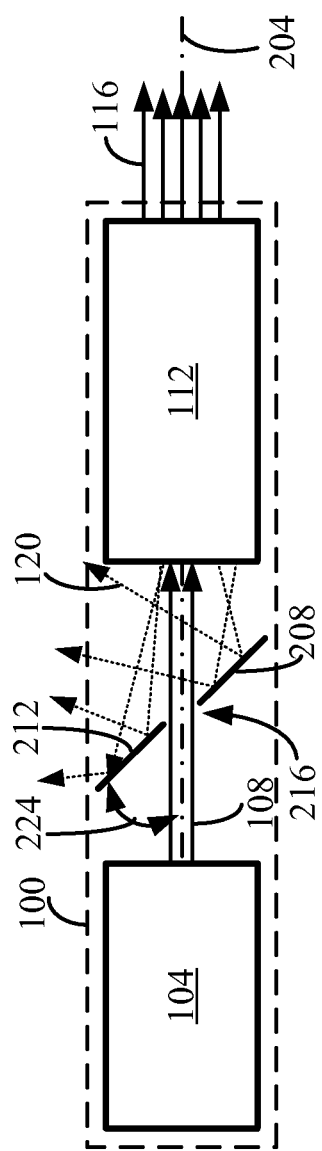
FIG. 2 is an example of a laser oscillator-laser amplifier configuration including a device for spontaneous emission feedback and spurious lasing reduction.

FIG. 2 is an example of a laser-oscillator-laser-amplifier configuration including a device for spontaneous emission feedback and spurious lasing reduction. Laser oscillator-laser amplifier configuration 200 includes a laser oscillator 104 configured to generate a laser beam 108 and laser amplifier 112 configured to receive oscillator laser beam 108, amplify it and emit a higher power laser beam 116. Laser oscillator 104 and laser amplifier 112 are arranged on a common optical axis 204. Laser oscillator 104 could be such as a Q-switched Nd:YAG laser and laser amplifier 112 could be for example, such as frequently used flash lamp or laser pumped high-gain Nd:YAG amplifier. The amplifier gain medium could be any of the rare earth or transition metal doped crystal or ceramic materials which when suitably pumped exhibit high gain at the oscillator wavelength.

A device, which could be a plate 208 with a flat reflecting surface 212 is located between a laser oscillator laser amplifier optical systems and oriented at an angle to common optical axis 204. The angle 224 at which the plate or flat reflecting surface 212 of the plate oriented to common optical axis 204 of the laser oscillator laser amplifier optical system could be 1 degree to 90 degrees with respect to the common optical axis 204 of the laser oscillator laser amplifier optical system. Typically, angle 224 between flat reflecting surface 212 of the plate 208 and common optical axis 204 would be 30 degrees to 60 degrees and usually close to 45 degrees.

Plate 208 and in particular reflecting surface 212 of the plate is configured to angularly separate from path of laser beam 108 generated by a laser oscillator 104 spontaneous emission 120 emitted by laser amplifier 112. Plate 208 includes an aperture 216. The aperture is configured to transmit laser beam 108 generated by laser oscillator 104. Optical axis 220 of aperture 216 coincides with common optical axis 204 of the laser-oscillator-laser-amplifier optical system. Typically, but not necessary, aperture 216 is located in the center of plate 208. In one example plate 208 is a polished metal plate with an aperture or hole 216.

The use the plate 208 with aperture 216 in the current disclosure is different from a spatial filter often used to "scrape off" the higher order modes from the oscillator beam before input into the amplifier. Higher order modes result in a larger focal spot which can be effectively blocked by an aperture in a plate, the aperture being small enough to pass only the fundamental mode. Aperture 216 in the current invention has no mode selection function.

The size of the aperture 216 could vary. As illustrated in FIG. 2, laser beam 108 is not focused (collimated) and passes through aperture 216 as it was generated by the laser oscillator. Such configuration could require a large apertures that could be sufficient to allow to pass a non-focused or collimated laser beam. Such aperture could have a diameter of several millimeters, for example 4 to 7 millimeters.

FIG. 3 is an example of a laser oscillator-laser amplifier configuration including a device for spontaneous emission feedback and spurious lasing reduction.

Laser beam 108 emitted by laser oscillator 104 is focused. Plate 208 with reflective surface 212 and aperture 216 could be located such that aperture 216 will coincide with the focal point of the focused laser oscillator beam 108 emitted by laser oscillator 104. In such configuration the smallest size or dimension of aperture or hole 216 could be sufficient enough to allow to pass a tightly focused single-mode laser beam and it could be 10 to 50 micrometers in diameter.

In another example, plate 208 could be a glass plate coated by a high-reflection dielectric or metal coating with an aperture or area 216 coated with an antireflection-coating. In a further example, aperture 216 could be a hole in an uncoated or coated by laser radiation absorbing coating plate. The laser oscillator beam 108 passes through the hole.

Plate 208 could have a round shape, an elliptical shape and a square or rectangular shape. The reflecting surface of the plate could be a flat, convex, or concave surface. In order to reduce potential scattering from the reflecting surface, the plate surface is highly polished (at least 10/10 or better according to MIL-13830B) and kept dust free. The thickness of the plate with a flat reflecting surface has been selected to reduce back scattering from the aperture and could be 0.8 mm to 2.0 mm.

FIG. 4 is a schematic illustration of an example of the device for spontaneous emission and spurious lasing reduction operation.

Figure 5:
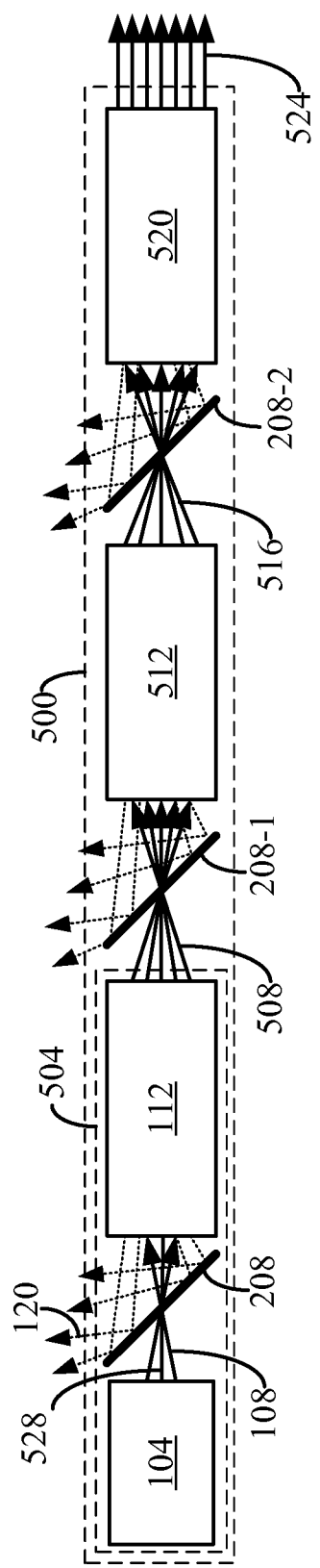
FIG. 5 is another example of use of the device for spontaneous emission feedback and spurious lasing reduction operation.

The performance obtainable from laser oscillator laser amplifier 200 or a single stage amplifier is often insufficient for some applications, hence several stages may be combined forming a multistage laser oscillator-laser amplifier configuration 500 shown in FIG. 5. The laser amplifier stages are connected in cascade, i.e. output 504 of the first or previous laser amplification stage 508 is connected to form input of second or next stage 512, whose output 516 becomes input of third stage 520, and so on. Plate 208 (208-1, 208-2) could be inserted between the stages and oriented at an angle to common optical axis 528 of the laser oscillator-laser amplifier configuration. The plate could be configured to angularly separate from path of excitation laser beam and spontaneous emission 120 emitted by each stage of the laser amplifier. Plates 208 could be configured to reflect different wavelength that could be emitted by different laser amplifiers of the multistage laser amplifier. In a multistage laser amplifier using several amplifiers in a sequence the output power 524 of the last in the sequence amplifier could be significantly increased.

Figure 6:
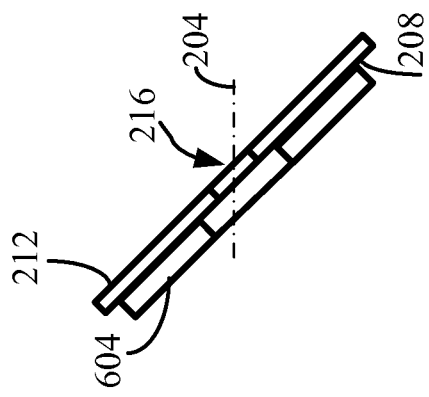
FIG. 6 is a schematic illustration of another example of a laser oscillator-laser amplifier configurations of a device for spontaneous emission feedback and spurious lasing reduction.

In some examples the power of spontaneous emission and spurious lasing reduction operation reflected or deflected or absorbed by one of plates 208 located between the laser amplifier stages and oriented at an angle to optical axis could be significant and require plate 208 cooling. FIG. 6 is a schematic illustration of another example of a device for spontaneous emission and spurious lasing reduction. A thermoelectric cooler 604 or a cooling fluid conducting channels could be implemented on the rear side of one or more plates 208, although in some examples convective air cooling could be sufficient.

Experiments performed with an Nd:YAG laser oscillator laser amplifier system without the ASE plate showed the maximum output from the laser to be limited by self-lasing to 400 mJ. While the same system delivered 630 mJ with the addition of the ASE plate. A separate measurement of the gain in the laser amplifier also showed that the gain reached much higher levels indicating a larger energy storage capacity with the use of the plate compared with the same system without the plate.

The examples have been described for the purposes of illustrating the structural and functional principles of the present laser oscillator laser amplifier structure, as well as illustrating the methods of employing the examples. The examples could be subject to change without departing from such principles. Therefore, the examples include all modifications encompassed within the spirit of the following claims.

What is claimed is:

1. A device comprising:
   a plate with a reflecting or absorbing surface oriented at an angle to a common optical axis of a laser oscillator-laser amplifier optical system and the plate being located in spaced relation between the laser oscillator and the laser amplifier, the plate being configured to angularly separate from a path of a laser beam generated by a laser oscillator from spontaneous emission emitted by the laser amplifier; and
   an aperture located through the reflecting or absorbing surface and configured to permit transmission of the laser beam generated by the laser oscillator;
   wherein an optical axis of the aperture coincides with the optical axis of the laser-oscillator-laser-amplifier optical system.

2. The device according to claim 1, wherein the angle between the reflecting surface and the optical axis of the laser oscillator laser amplifier optical system is 1 degree to 90 degrees with respect to the optical axis of the laser oscillator laser amplifier optical system.

3. The device according to claim 1, wherein the plate with a reflecting surface is one of a group of plates consisting of a polished metal plate with an aperture, a glass plate coated by a high-reflection dielectric coating with an aperture located in a center of the plate and coated by an antireflection-coating, or a laser radiation absorbing plate with a hole where beam emitted by laser oscillator passes through.

4. The device according to claim 1, wherein the reflecting surface of the plate is one of a group of surfaces consisting of flat, convex, or concave surface.

5. The device according to claim 1, wherein the plate with a reflecting or absorbing surface oriented at an angle to optical axis includes a cooling arrangement and wherein the cooling arrangement is one of a group of arrangement consisting of a thermoelectric cooler, convective air cooling and a fluid conducting tubes.

6. The device according to claim 1, wherein thickness of the plate with a flat reflecting surface and aperture located on the plate has been selected to reduce back scattering from the aperture.

7. A laser amplifier comprising:
   a laser oscillator;
   a laser amplifier; and
   a reflector located between the laser oscillator and the laser amplifier and oriented at an angle of less than 90 degrees to a common optical axis of the laser oscillator and the laser amplifier and configured to reflect spontaneous emission emitted by the laser amplifier;
   wherein the reflector includes an aperture configured to permit transmission of a laser beam generated by the laser oscillator and wherein the axis of the aperture coincides with the optical axis of the laser oscillator-laser amplifier.

8. The laser amplifier according to claim 7, wherein the reflector interposed between the laser oscillator and laser amplifier is one of a group of reflectors consisting of a polished metal plate with an aperture, a plate coated by a high-reflection dielectric or metal coating with or an aperture coated by an antireflection-coating.

9. The laser amplifier according to claim 8, wherein the reflector interposed between the laser oscillator and laser amplifier is a flat surface reflector.

10. The laser amplifier according to claim 7, wherein the laser amplifier includes a multistage laser amplifier.

11. A method for reducing parasitic lasing and increasing energy storage and extraction from a laser amplifier comprising:
    providing a laser oscillator and a laser amplifier arranged on a common optical axis; and
    locating between the laser oscillator and the laser amplifier at an angle to the common optical axis a plate with a reflective surface and an aperture and orienting the plate at an angle to the common optical axis;
    wherein the reflective surface is configured to angularly separate path of the laser beam emitted by the laser oscillator and spontaneous emission and the aperture is configured to allow the laser beam generated by the laser oscillator to pass through.

12. The method according to claim 11, wherein reducing laser beam scattering by polishing the reflective surface to at least 10/10 surface quality.

13. A laser oscillator laser amplifier optical system comprising:
    a laser oscillator and a laser amplifier arranged on a common optical axis; and
    a reflecting surface located between the laser oscillator and the laser amplifier at an angle to the common optical axis; and
    wherein the reflecting surface includes an aperture configured to permit transmission of a laser beam generated by the laser oscillator and deflect spontaneous emission emitted by the laser amplifier and wherein the axis of the aperture is coinciding with the common optical axis.

14. The laser oscillator laser amplifier system according to claim 12, wherein the reflector interposed between the laser oscillator and the laser amplifier is a plate with a flat reflecting surface oriented at an angle to common optical axis, the plate is configured to angularly separate from a path of laser beam generated by laser oscillator spontaneous emission emitted by the power amplifier.

15. A multistage laser oscillator laser amplifier system comprising:
    a laser oscillator and a number of laser concatenate amplifiers arranged on a common optical axis such that output of a previous laser amplification stage forms input to next laser amplification stage; and
    at least one reflecting surface located between the laser amplifier stages and oriented at an angle to the common optical axis;
    wherein the reflecting surfaces include an aperture configured to permit transmission of a laser beam generated by the previous laser amplification stage and deflect spontaneous emission emitted by the laser amplifier of the next stage.

16. The laser amplifier according to claim 1, further comprising a thermoelectric cooler constructed and arranged to cool a rear side of the plate.

17. The laser amplifier according to claim 1, further comprising conducting channels, for cooling, associated with a rear side of the plate.

18. The laser amplifier according to claim 7, further comprising a thermoelectric cooler constructed and arranged to cool a rear side of the reflector.

19. The laser amplifier according to claim 7, further comprising conducting channels, for cooling, associated with a rear side of the reflector.

20. The multistage laser oscillator laser amplifier system according to claim 15 wherein at least one reflecting surface located between the laser amplifier stages and oriented at an angle to the common optical axis includes a cooling arrangement.

* * * * *